United States Patent [19]

Takahashi et al.

[11] Patent Number: 4,930,349

[45] Date of Patent: Jun. 5, 1990

[54] GAS RATE SENSOR

[75] Inventors: Fumitaka Takahashi, Wako; Kunio Okazaki, Hatano; Masaru Shiraishi, Tokyo; Masayuki Takahashi, Hatano; Kazufumi Obara, Tokyo; Koji Yorimoto; Tohru Tanabe, both of Yokohama, all of Japan

[73] Assignee: Honda Giken Kogyo Kabushiki Kaisha & Stanley Electric Co., Tokyo, Japan

[21] Appl. No.: 193,404

[22] Filed: May 12, 1988

[30] Foreign Application Priority Data

May 29, 1987 [JP] Japan ................................. 62-131327
May 29, 1987 [JP] Japan ................................. 62-131329

[51] Int. Cl.$^5$ .............................................. G01P 9/00
[52] U.S. Cl. ................................... 73/497; 73/516 LM
[58] Field of Search .................... 73/497, 505, 516 LM, 73/515

[56]  References Cited

U.S. PATENT DOCUMENTS 4,408,490 10/1983 Takahashi et al. ............ 73/516 LM
4,584,878  4/1986 Katsuno ........................ 73/516 LM Primary Examiner—John Chapman
Attorney, Agent, or Firm—Louis E. Marn

[57]  ABSTRACT

The gas rate sensor in the present invention is provided with a holder assembly having a metallic holding portion for holding flow sensors and a cylindrical casing containing the holder assembly and heater wires which are wound around the outside thereof. The outer periphery of the holding portion is provided with a plural number of projections which are brought into compressive contact with the inner periphery of the casing for enabling pressing of the holder assembly into the casing. A temperature detection element is disposed in a gas flow passage between the holder assembly and the casing for performing energizing control of the heater wires.

3 Claims, 3 Drawing Sheets

FIG. 3
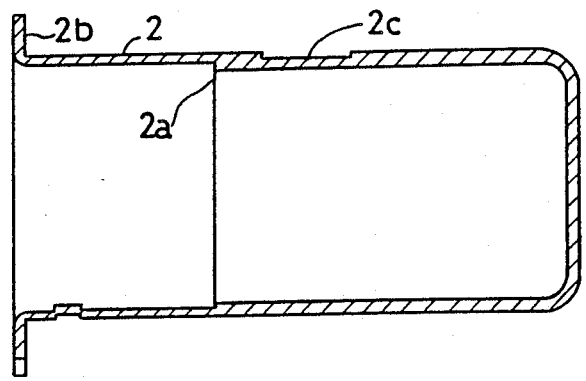
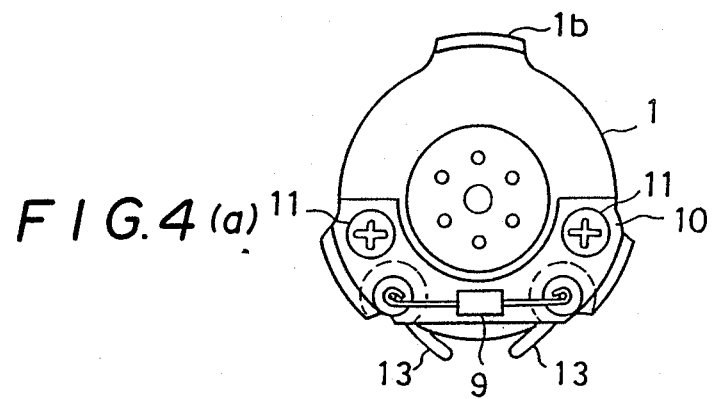
FIG. 4(a)
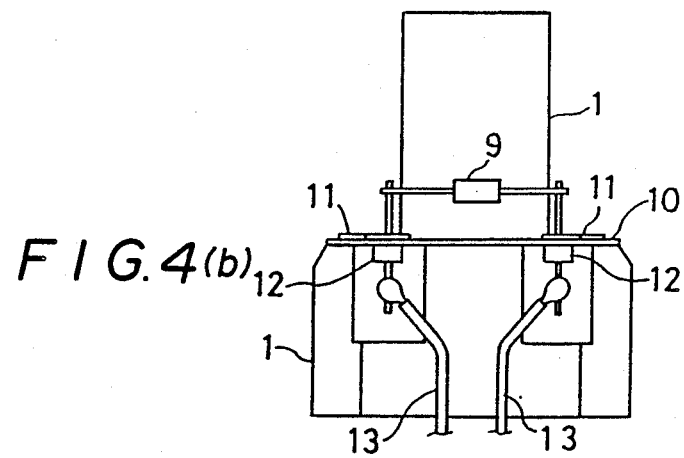
FIG. 4(b)

GAS RATE SENSOR

BACKGROUND OF THE INVENTION (1) Field of the Invention

The present invention relates to a gas rate sensor for maintaining especially gas temperature constant.

(2) Description of the Prior Art

Conventional gas sensors contain a holder assembly having a flow sensor in a hermetic, metallic casing and a gas flow is injected towards a thermosensitive element in the flow sensor to detect the angular velocity (the rate) on the basis of variation in the sensor output produced when the gas flow is deviated by the effect of the angular velocity movement exerted from the outside. Because variation in the ambient temperature may, in this case, exert adverse effect on the detection precision, a proposal has been offered to wind heater wires around the outside of the casing containing the holder assembly to maintain the casing and the inside thereof at a constant temperature.

FIG. 6 illustrates a structural diagram showing the main portion (main body) of a conventional gas rate sensor provided with heater wires in this type. In this drawing, a numeral 1 denotes a holder assembly containing a flow sensor and the like in the inside and a numeral 2 denotes a metallic casing containing the holder assembly 1 with the inside of the casing being hermetic. Heater wires 3 are helically wound around the outside of the casing 2 through the intermediary of an insulator and a thermister 4 which is a temperature detection element is attached to the outer surface of the casing 2 by means of an adhesive. Thermosensitive elements 5a and 5b and a piezo plate 6 constituting the flow sensor are held in the holder 1a of the holder assembly 1. Gas from an exhaust port 7 passes, as given in an arrow mark in the drawing, through a portion between the holder assembly 1 and the casing 2 to define a gas flow passage from a nozzle 8 at the end of the holder assembly 1 to the inside of the holder.

In the main body of the gas rate sensor thus constructed, inside of the casing being hermetic, a constant gas flow is injected from the nozzle 8 towards the thermosensitive elements 5a and 5b of the flow sensor and is deviated when the effect of the angular velocity movement is exerted from the outside. In this case, the degree of the angular movement can be detected by detecting variation in the output of the flow sensor. Conduction of the heater wires 3 is controlled by the detection signal of the thermister 4 and the temperatures of and in the casing 2 are maintained constant by means of the feedback control whereby the casing 2 acts as a thermostat. For this reason, even if the ambient temperature has varied, no effect is exerted on the holder assembly 1 whereby a high degree of detection precision can be obtained.

Because the above gas rate sensor is merely so constructed that the holder assembly 1 is inserted into the casing 2, however, the contact area of the holder 1a with the casing 2 is small and temperature control is performed while detecting the temperatures of the casing 2 and the heat wires 3 by means of the thermister 4. Accordingly, there are problems in that the temperature of the structure in the holder assembly 1 slowly rises and stabilizes, resulting in poor detection characteristics and the fixing member of the holder assembly 1 is required.

Meanwhile, known cited references are U.S. Pat. Nos. 3,587,328 dated June 28, 1971, 3,628,371 dated December 21, 1971, 4,020,699 dated May 3, 1977, 4,020,700 dated May 3, 1977 and 4,026,159 dated May 31, 1977.

SUMMARY OF THE INVENTION

It is an object of the present invention to provide a gas rate sensor which rapidly rises and stabilizes the temperature of the structure in the holder assembly and which has few parts.

Accordingly, the gas sensor in the present invention is provided with a holder assembly having a metallic holder for holding a flow sensor and the like and a cylindrical casing containing the holder assembly and having heater wires wound around the outside thereof. The outer periphery of the holder is provided with a plural number of projections which are brought into compressive contact with the inner peripherical surface of the casing to press the holder assembly into the casing. A gas flow passage between the holder assembly and the casing is provided with a temperature detection element to perform energizing control of the heater wires. Such a structure enables containing the holder assembly in the casing without any fixing member and simultaneously increases both contact areas thereby improving detection characteristics.

The casing is made of iron or an iron alloy with the outer periphery having a single taper of an axial diameter which is the same or within 1/10 and with a step among the two different diameter portions inside thereof and these different diameter portions. The thickness of the pressing portion into which the holding portion of the holder assembly is pressed is made not more than 1/10 the diameter of the pressing portion thereby easily providing a structure of reasonal detection characteristics.

The temperature detection elements are arranged not only in the inside of the casing but also in the heater wires to control the heater wires based on detection signals. from these tempature detection elements thereby preventing the extreme overshot of the heater wire temperature.

BRIEF DESCRIPTION OF THE DRAWINGS

FIG. 3 illustrates a cross-sectional view showing the external shape of the casing in FIG. 1.

FIGS. 4 (a) and (b) illustrate a plan view and a side view showing a state at which a thermister is attached to the holder assembly.

DETAILED DESCRIPTION OF PREFERRED EMBODIMENTS

Figure 1:
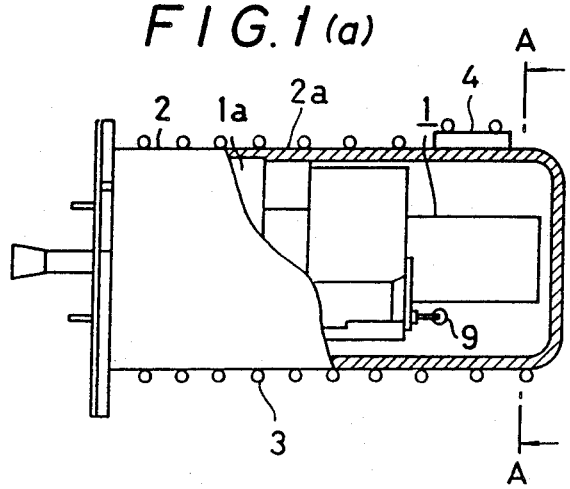
FIGS. 1 (a) and (b) illustrate a structural diagram showing one embodiment of the invention and a cross-sectional view taken along the lines A—A, respectively.
Figure 1:
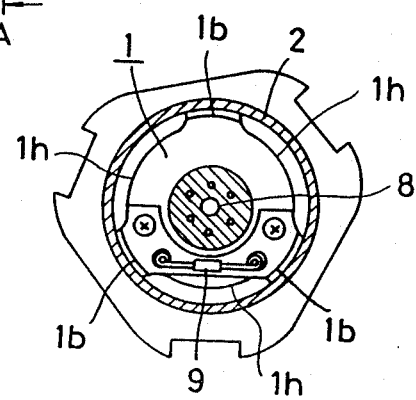

FIG. 1 illustrates diagrams giving one embodiment of the present invention, in which FIG. 1(a) is a partically cutaway structural diagram thereof and FIG. 1(b) is a cross-sectional view taken along the lines A—A. In the drawing, the holder portion 1a of a holder assembly 1 is made of a metal of good thermal conduction such as aluminum, copper, or an alloy thereof and contains a flow sensor and a piezo plate in the inside thereof. The holder portion 1a is provided with a plurality of (three in the drawing) projections which are brought into compressive contact with the inner circumference of a casing 2. The metallic casing 2 is provided with a stepped portion 2a as a stopper portion, for housing the holder assembly 1 at a predetermined position. The outside of the casing 2 is provided with heater wires 3 wound therearound, in which a thermister 4 is arranged as a temperature detection element. A gas (helium) flow passage between the holder assembly and the casing 2 is provided with a thermister 9 for temperature control.

Figure 2:
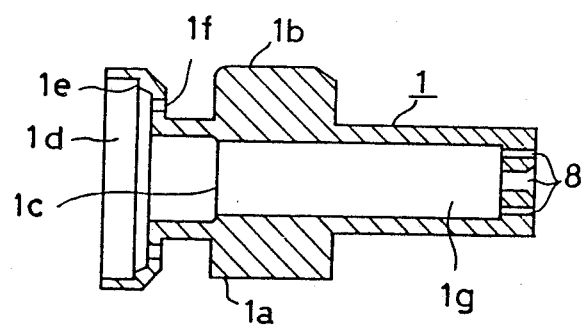
FIGS. 2 (a) and (b) illustrate a longitudinal cross-sectional view and a side view showing the detail of the holder assembly in FIG. 1 respectively.
Figure 2:
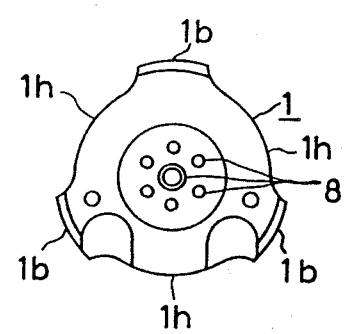

FIG. 2 illustrates diagrams showing the detail of the holder assemby 1, wherein FIG. 2(a) is a longitudinal cross-sectional view thereof and FIG. (b) is a side view thereof. The holder assembly 1 contains nozzles 8 for producing the streamline flow of the helium gas in the inside thereof and, in addition, an eccentric sleeve 1g which is rate-sensed by the streamline flow, a flow sensor-attaching portion, 1c, and a pump chamber 1d, all of which are subjected to high precision processing. A flow sensor and a piezo plate are mounted in assembling the above.

The outer periphery of the holder portion 1a is provided with three projections 1b having contacting surfaces when they are pressed into the casing 2, convey wall surfaces 1h for contacting the flowing gas divided by these projections 1b with the inner wall surfaces of the casing 2 to the utmost, a screw hole of a thermister 9 for detecting the gas temperature, the relieving groove and the inserting hole of the respective lead wires from the thermister 9 and the flow sensor, and a jet hole 1f for rendering the gas from the piezo plate in a constant direction. The outer diameter of the pump chamber 1d in which the piezo plate is disposed is maximum because of a stepped portion 1e as a stopper when the piezo plate is pressed into and housed in the chamber.

FIG. 3 illustrates the external shape of the casing 2, which is in the form of a cup and has a deformed, triangular flanged portion 2b (refer to FIG. 1b)) in the opening. The inner diameter on the opening side thereof is maximum for housing the pump chamber of the above-described holder portion 1a and a stepped portion 2a is provided between the portion of the maximum diameter and the contact point of the projected portion 1b in the holder assembly 1. The outer periphery is cylindrical or in the form of a taper of 1/10 or less the diameter and the thickness of the portion into which the holder portion 1a of the holder assembly 1 is pressed 1/10 or less the diameter in the portion. A portion of the outer periphery is provided with a plane 2c for attaching the above-described temperature-controlling thermister 4 thereto and heater wires 3 are helically wound around the outer periphery including the thermister 4.

FIGS. 4 (a) and (b) illustrates a plan view and a side view showing respectively, a state in which the temperature-controlling thermister 9 is attached to the holder assembly 1 (refer to FIG. 1). A metallic fix plate 10 having a piercing hole is secured to the holder assembly 1 by means of a screw 11 and a glass terminal 12 connected to a lead wire 13 is secured to the piercing hole. The thermister 9 is connected to the end of the glass terminal by means of soldering. Such an attaching structure enables arrangement of the thermister 9 at a predetermined position in the gas flow passage at any time.

In the gas rate sensor constructed as described above, a flow sensor is provided in the inside the holder assembly 1 which is housed in the inside of the casing 2 as with conventional cases and a constant amount of gas flow is blown from the nozzle (8) toward the thermosensitive element of the flow sensor.

Effect of angular velocity movement exerted from the outside of the gas rate sensor deviates the gas flow, resulting in variation in the output value of the flow sensor in such a case. Accordingly, detection of the variation in the output of the flow sensor establishes the magnitude of the angular velocity. In this case, variation in the temperature in the casing 2 caused by variation in the ambient temperature may affect the detection precision. Accordingly, the heater wires 3 are wound around the outside of the casing 2 to perform feedback control by means of a control circuit (not shown). Two thermisters 4 and 9 detect the temperature of the heater wire and the atmospheric temperature in the casing 2 to perform energizing control of the heater wires 3 according to these detection temperatures.

Because superimposed information obtained by these two thermisters 4 and 9 performs temperature control, the heater wire temperatrure is moderately overshot to compensate the time lag of the atmospheric temperature elevation in the casing 2 with regard to the temperature elevation of the heater wires 3. For this reason, the rising characteristics of the temperature elevation is improved to rapidly attain a stable condition and the extreme overshot of the heater temperature is simultaneously suppressed. In such a way, trouble such as blow of a temperature fuse can be avoided and adverse effect on an electronic circuit is also relieved.

Figure 5:
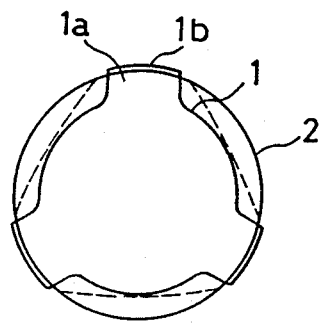
FIG. 5 illustrates a diagram explaining the deflecting effect of the casing.
Figure 6:
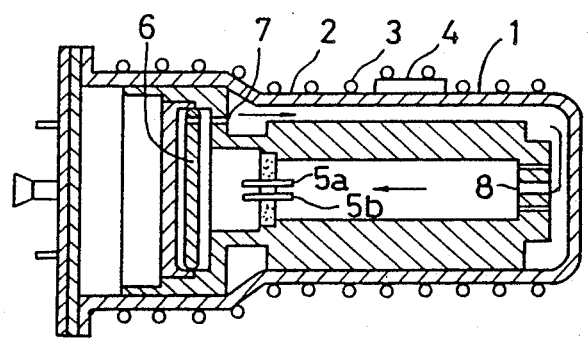
FIG. 6 illustrates a longitudinal cross-sectional view of a conventional gas rate sensor.

In assemblage, the holder assembly 1 can be secured only by pressing the holder assembly 1 into the casing 2 with no securing members such as a ring screw (a plate end) or punch caulking operation required whereby the number of assemblage and cost can be reduced. As given by dotted lines in FIG. 5, in this case, pressing the holder assembly 1 deflects the casing 2, but the holder portion 1a of the holder assembly 1 can easily be pressed with pressurized force in a degree that causes no deformation thereof. Accordingly, the inner contact surface of the projected portion 1b of the holder portion 1a with the casing 2 need not be processed with extremely high precision. Because deflection of the casing 2 occurs less frequently with increased thickness thereof, the thickness on the portion is 1/10 or less the pressed diameter.

The holder assembly 1 is pressed utilizing the deflecting effect of the casing 2 and contact area of the holder assembly 1 with the casing 2 is large, such that the heat of the casing 2 is rapidly transferred to the holder assembly 1 whereby the gas is heated from both sides of the casing 2 and the holder assembly 1. The holder portion 1a is so formed that the gas efficiently flows along the inner walls of the casing 2 and structures such as a flow sensor and a piezo plate in the holder assembly 1 rapidly follow the gas flow thermally, whereby the temperatures of these structures rapidly rise and are stabilized, resulting in improvement in the detection characteristics. Because the outer periphery of the casing 2 is cylindrical or in the form of a single, low taper of 1/10 or less the diameter without a concave or convex portion or a curved portion (with regard to the axial direction), winding of the heater wires can easily be operated and thermal conduction from the heater wires to the casing 2 is satisfactory. In addition, the thermister 9 is disposed in the gas flow passage between the holder assembly 1 and the casing 2, such as the real-time detection of the gas temperature is possible for performing high-degree temperature control.

The thermisters 4 and 9 disposed inside and outside the casing 2 may be connected either in series or parallel.

What is claimed is:

1. A gas rate sensor assembly, which comprises:
   a metallic casing formed with a chamber and having heater wires wound about an outer surface thereof;
   a holder assembly having a metallic body portion formed with a plurality of peripherally disposed and outwardly extending projections, each projection having a contacting surface, said holder assembly disposed in said chamber of said metallic casing defining a gas flow passageway therebetween, said contacting surface of said projections being compressed contacting relationship with said metallic casing; and
   a first temperature detection element mounted to said metallic body portion of said holder assembly in said gas flow passageway and a second temperature detection element mounted on said outer surface of said metallic casing and cooperating with said first temperature detection element mounted to said metallic body portion for controlling power level to said heater wires.

2. The gas rate sensor assembly as defined in claim 1 wherein said metallic casing is formed of iron or an iron alloy and wherein a leading portion of said contacting surface of said projections is tapered and wherein an inner surface of said metallic casing is formed with a stepped portion of a diameter 1/10 or less than a diameter of said contacting surface of said projections for receiving in compressed contacting relationship said contacting surfaces of said projections.

3. The gas rate sensor assembly as defined in claim 1 wherein three projections are formed on said metallic body portion.

* * * * *

UNITED STATES PATENT AND TRADEMARK OFFICE
CERTIFICATE OF CORRECTION

PATENT NO. : 4,930,349
DATED : JUNE 5, 1990
INVENTOR(S) : TAKAHASHI ET AL.

It is certified that error appears in the above-identified patent and that said Letters Patent is hereby corrected as shown below:

In the Claims

Claim 1, column 5, line 19, after "being", insert -- in --; and Column 6, line 6, "temerature", should read -- temperature --.

Signed and Sealed this

Eleventh Day of June, 1991

Attest:

HARRY F. MANBECK, JR.

Attesting Officer

Commissioner of Patents and Trademarks